(12) United States Patent
De Vaal et al.

(10) Patent No.: US 10,237,607 B2
(45) Date of Patent: Mar. 19, 2019

(54) ELECTRONIC CONTROL DEVICE

(71) Applicant: SPIN HOLDING B.V., Geldermalsen (NL)

(72) Inventors: Gerardus Geertruud De Vaal, Kenilworth (ZA); Johannes Arnoldus Theodorus Van Bremen, Meteren (NL)

(73) Assignee: SPIN Holding B.V., Geldermalsen (NL)

( * ) Notice: Subject to any disclaimer, the term of this patent is extended or adjusted under 35 U.S.C. 154(b) by 86 days.

(21) Appl. No.: 15/521,857

(22) PCT Filed: Nov. 11, 2015

(86) PCT No.: PCT/EP2015/076350
§ 371 (c)(1),
(2) Date: Apr. 25, 2017

(87) PCT Pub. No.: WO2016/075203
PCT Pub. Date: May 19, 2016

(65) Prior Publication Data
US 2018/0288464 A1    Oct. 4, 2018

(30) Foreign Application Priority Data

Nov. 14, 2014 (ZA) .................... 2014/08322

(51) Int. Cl.
| | |
|---|---|
| *G06F 3/044* | (2006.01) |
| *G08C 17/02* | (2006.01) |
| *G08C 23/04* | (2006.01) |
| *G06F 3/0346* | (2013.01) |
| *H04N 21/422* | (2011.01) |

(52) U.S. Cl.
CPC ..... *H04N 21/42222* (2013.01); *G06F 3/0346* (2013.01); *G06F 3/044* (2013.01); *G08C 17/02* (2013.01); *G08C 23/04* (2013.01); *H04N 21/42224* (2013.01); *H04N 21/42226* (2013.01); *G08C 2201/32* (2013.01)

(58) Field of Classification Search
CPC .. H04N 21/42222; G06F 3/0346; G06F 3/044
See application file for complete search history.

(56) References Cited

U.S. PATENT DOCUMENTS

| | | |
|---|---|---|
| 2004/0218104 A1 | 11/2004 | Smith et al. |
| 2005/0253806 A1 | 11/2005 | Liberty et al. |
| 2009/0002218 A1 | 1/2009 | Rigazio et al. |
| 2013/0057472 A1* | 3/2013 | Dizac ................ G06F 3/03543 345/163 |

FOREIGN PATENT DOCUMENTS

WO    WO-2010095069    8/2010

* cited by examiner

*Primary Examiner* — Kevin M Nguyen
(74) *Attorney, Agent, or Firm* — Marcus C. Dawes; Daniel L. Dawes (57) ABSTRACT

An electronic remote control device, including a body; a touchpad formed by capacitive sensors; a processor and software; and position sensors; wherein the processor and software are arranged to read out inputs from the position sensors and dynamically allocate functions to the capacitive sensors in the touchpad depending on the position of the touchpad in relation to the horizon.

6 Claims, 10 Drawing Sheets

ELECTRONIC CONTROL DEVICE

FIELD OF INVENTION

The present invention relates to an electronic control device.

More particularly, the present invention relates to an electronic control device adapted to interface with multiple electronic devices, including, but not limited to televisions, sound systems and lighting controls.

BACKGROUND TO INVENTION

Conventional remote controls have a standardized button layout pattern, that consists of multiple buttons of which five of those act as the main instructors; four of these buttons are usually evenly spaced in a circular pattern with the fifth one in the centre; the top and bottom buttons in the circular pattern in the conventional controls represent the navigate up and down functions, the left and right buttons represent the navigate left and right functions and the centre button represent the ok/enter function; this layout could be regarded as the industry standard, as it characterizes the button layout system most manufacturers choose to use; the rationale behind this standardization is to tap into previously learned behaviours of the consumer; once the association between button and function is made, the consumer can operate the device without direct visual interaction; it is important to note that the circular design is significant in that it alerts the user of the placement of the buttons in relation to each other and the function associated with each button.

PCT/IB2010/050545 disclosed an electronic control device, such as a remote control for operating electronic equipment, having a body with at least one movement sensor for sensing movement of the body relative to a static point. The control device generates various function control signals, including infrared commands to devices, for the electronic equipment dependent upon the type of movement of the body. The movement would include moving or rotating the electronic device in a circular pattern.

This prior art also demonstrates that the sensing aspect of the remote control is done via an optical or mechanical sensor. The sensitivity and success of the optical sensor's ability to transmit commands depends heavily on the distance between the sensor and the surface as well as the compatibility of the surface with the sensors optical abilities.

The rotation of these remote control devices is measured by a mechanical sensor situated in the lower end of the device which deteriorates over prolonged periods of time.

SUMMARY OF INVENTION

According to a first aspect of the invention an electronic control device includes a body; a touchpad formed by capacitive sensors; a processor and software; and position sensors; wherein the processor and software are arranged to read out inputs from the position sensors and dynamically allocate functions to the capacitive sensors in the touchpad depending on the position of the touchpad in relation to the horizon.

According to another aspect of the invention an electronic control device includes a body; multiple capacitive sensors supported by the body and adapted to detect interaction of the body with its surroundings; and processing means for generating various function control signals dependent upon the interaction of the body.

According to a further aspect of the invention an electronic control device includes a body; a shell; wherein the device is arranged such that when the shell is removed, the operational mode of the device changes automatically.

According to a further aspect of the invention an electronic control device includes a body; and a round base; wherein the round base illuminates making a feedback signal visible from any direction.

According to a further aspect of the invention an electronic control device includes a body; a round base; and multiple infrared diodes mounted inside the base, wherein the diodes are mounted in such a way that the infrared viewing angle is 360 degrees.

According to a further aspect of the invention an electronic control device includes a body; and a radio transceiver that supports a proximity related function, wherein the device is arranged to determine the distance from its own position to other compatible radio transceivers within its range.

Further preferred features of aspects of the invention are mentioned below.

The body may have a base.

The multiple capacitive sensors may be located at the base of the device.

The multiple capacitive sensors may be adapted to detect any material within a detectable proximity and the processor may combine these sensor inputs with other sensor inputs to determine the location of the area being touched.

With these inputs, the correct actions may be performed like the transmission of a command.

The device is programmable in such a way that if the output value of all the sensors in the base are in a higher range, the deduction is that the base of the device is in contact with a wide surface.

If the output value of every sensor drops below a certain value, it is adapted to conclude that the device is being held in the air.

If only part of the sensors has a higher value, then it is probably being touched by a finger. Conventional remote controls have a standardized button layout pattern, that consists of multiple buttons of which five of those act as the main instructors.

Four of these buttons are usually evenly spaced in a circular pattern with the fifth one in the centre. The top and bottom buttons in the circular pattern in the conventional controls represent the navigate up and down functions, the left and right buttons represent the navigate left and right functions and the centre button represent the ok/enter function.

This layout could be regarded as the industry standard, as it characterizes the button layout system most manufacturers choose to use.

The rationale behind this standardization is to tap into previously learned behaviours of the consumer.

Once the association between button and function is made, the consumer can operate the device without direct visual interaction.

It is important to note that the circular design is significant in that it alerts the user of the placement of the buttons in relation to each other and the function associated with each button.

The device in accordance with the invention offers a similar association technique when the base is used as a touchpad, despite the absence of visual instructional indicators.

The unmarked circular base is of no concern to the user because the on-board positioning sensors allow the same action to be executed, irrespective of the position of the device.

These on-board positioning sensors calculate the position of the touchpad in relation to the horizon.

The software of this device allows functions to be dynamically allocated to the touchpad.

Sensors are allocated a function, but that function will change depending on the product position.

Consequently, no direct visual interaction is necessary to operate the device as the device utilizes previously learned behaviours acquired by the consumer.

The body of the device is shaped in such a way that the user can determine if the device is held upside down.

In an example of the embodiment, the body of the device tapers from the base upwards towards a smaller diameter at the top.

This distinct shape of the device enhances its ability to be used in areas of poor visibility.

By recognizing the features of the shape, the user can easily decipher between functions.

The shape makes it easier for the user to locate the base. Once the user locates the base, they are in complete control because the on-board positioning sensors assist with everything else.

The design of the shape plays an integral part in the functionality and successful use of the product. For example, if the shape was cylindrical, the above-mentioned statement could not be applied.

The shell is made up of an electrically conductive material or a non-conductive material which is treated or coated with a conductive material.

Electronics mounted on or within the base measure the capacitance of the shell.

This means that when the shell is touched by a human, there will be a drastic change in the capacitance of the shell.

A change of capacitance can also be detected if the shell is removed from the base.

The removal of the shell causes a drop in capacitance exposing the battery holder mounted on the top of the base.

When the shell is removed, the operational mode of the device can change automatically. For example it could go into recording mode.

In this mode, incoming infrared codes from other remotes can be recorded.

Once the shell is placed back on top of the base, the device switches back into its normal operating mode.

The automatic changing of state between normal and recording mode by merely removing or reattaching the shell, simplifies the operation of the device.

If the shell is mounted but not touched, the device changes from a full power to a low power state. In this state only a few functions are active in order to reduce power consumption.

A key feature of the device is the user feedback via light indication.

The entire round base illuminates making the feedback signal visible from any direction.

It can also be argued that the rationale for placing the light on the base, is because it is the most unlikely part of the remote to be covered by obstacles.

The user will more than likely be manipulating the device from the top, causing no or poor visibility on the light, if it had been placed on the top of the device.

The device uses RGB LED's, which have the ability to emit various shades of colour.

Each colour represents a different status in terms of function as well as mode.

The colour change serves as a feedback mechanism to the user indicating the changes in status(es), profiles and/or functions.

The base is preferably made of silicone and transparent or semi-transparent to cater for light in the visible and infrared spectrum.

Multiple infrared diodes are mounted inside the base.

These diodes are mounted in such a way that the infrared viewing angle is 360 degrees. This feature makes the device able to operate at any angle.

Another advantage of using multiple LEDs is the fact that the device can be used as an extender, converting and forwarding infrared signals it receives via its radio or infrared receiver.

The device fits into a cradle, which contains conduits mounted with fibre optic cables. These cables line up optically with the infrared diodes of the device.

The optic fibres act as light guide between the infrared diodes of the device and compatible equipment.

A key feature of the device is its robustness.

The base may be made of transparent or semi-transparent silicone. The reason for using silicone is because of its flexibility and the fact that it less prone to cracking than the plastic used in conventional remote controls.

Two circular printed circuit boards are mounted inside the silicone base which may press-fit into the edges of the base. No screws are required. The base itself may be press-fitted into the top metal shell. Contacts between the two printed circuit boards could be made in the form of spring-loaded contacts.

When spring contacts are used, circular tracks on one of the printed circuit boards are used as a landing zone for such contacts.

Due to the shape of such tracks both boards do not have to be aligned in respect to each other.

The spring contacts always land on the circular tracks of the other board.

This feature makes assembly easy and reduces mechanical stress between the two boards.

The device is equipped with a radio transceiver that supports a proximity related function.

This function allows the device to determine the distance from its own position to other compatible radio transceivers within its range.

These types of transceivers are often mounted in personal hand-held devices such as mobile phones.

The device has the ability to read out serialized numbers of other transceivers and make the association between the device and its users.

By recognizing the user in closest proximity to the device the assumption is made that this is likely that particular user operating the device.

With this information it can dynamically alter the functionality of the device in favour of that particular user.

One example of such is the dynamically selecting of favourite channels. If person A is operating the device, channel 1, 2 and 3 might be selectable. If user B is operating the device channel 3, 4 and 5 might be selectable as that might be that particular user's favourite channels etc.

In another example, if no registered user is in proximity to the device, like when both parents are absent, the device might block certain functions completely acting as a form of parental control.

BRIEF DESCRIPTION OF DRAWINGS

The invention will now be described by way of example with reference to the accompanying schematic drawings.

In the drawings there is shown in.

DETAILED DESCRIPTION OF DRAWINGS

Referring to the drawings, an electronic control device in accordance to the invention is shown.

Figure 1:
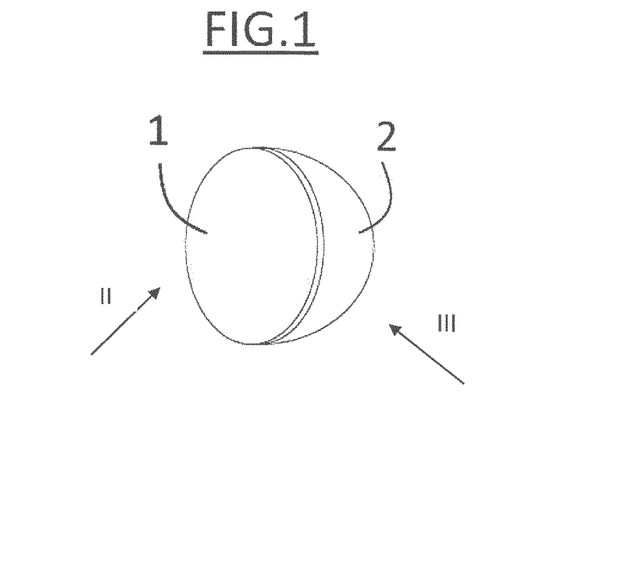
FIG. 1: a pictorial view of an electronic control device according to the invention.
Figure 2:
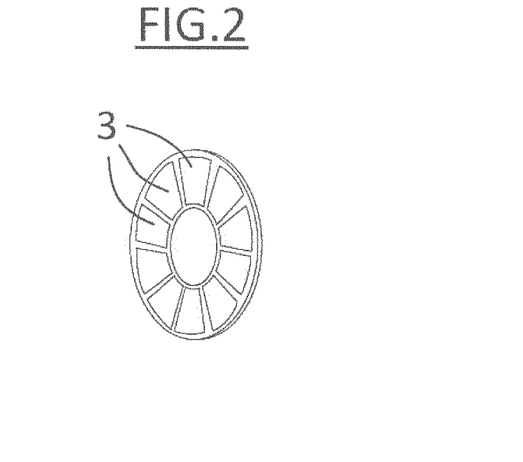
FIG. 2: an end view (i.e. a circular printed circuit board with capacitive sensors 3 printed on the bottom of the printed circuit board) seen along arrow II of the electronic control device shown in FIG. 1.

According to FIG. 1 the device consists of a base 1 and a shell 2. In the base 1 printed circuit boards are mounted. In FIG. 2 a circular printed circuit board is shown with capacitive sensors 3 printed on the bottom of the printed circuit board. These sensors are spread out over the bottom and form a touchpad. The capacitive sensors are able to sense through the bottom of the base 1. Each sensor is read out individually.

Figure 3:
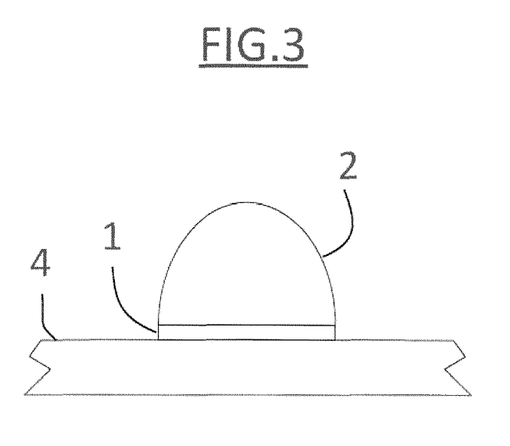
FIG. 3: a side view seen along arrow III of the electronic control device shown in FIG. 1.

In FIG. 3 the device is shown placed on a flat surface 4. All sensors will register an increased reading as the surface is made of material unequal to air. With help of these readings the device becomes aware if it is placed on a flat surface as all sensors reading rise equally.

In FIG. 1 the device base is held in the air. The capacitive sensors register a low capacitance. As a result the device is aware that is hold in the air. When the bottom of the base 1 is touched by a finger, only one or few sensors 3 will register an increased capacitance. The device is then aware that it is touched by a finger. It is important to note that the touchpad is not used in the conventional way by sensing touch of the user's finger or fingers only. It also offers information whether the device is placed on a surface or being held in the air etc.

Figure 4:
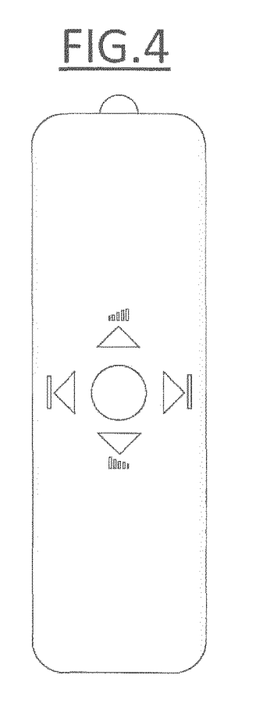
FIG. 4: a view of a conventional remote control.

In FIG. 4 part of a popular button layout of a conventional remote control is shown. It consists of 4 buttons evenly spaced around a fifth button in the centre. After repetitive use, the user starts to associate the position of such buttons in relation to each other and knows what function those buttons belong to. A goal of the invention is to achieve a similar association when the base is touched by a finger of the user.

Figure 5:
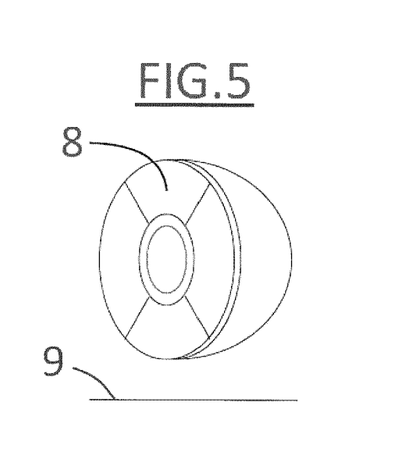
FIGS. 5 to 10: different variations of the electronic control device in accordance with the invention.

In FIG. 5 areas are marked on the touchpad demarcating five buttons positions with respect to the horizon 9. Area 8 indicates the "up button" region.

Figure 6:
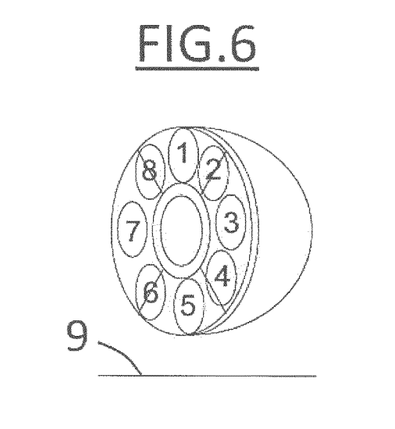
Figure 7:
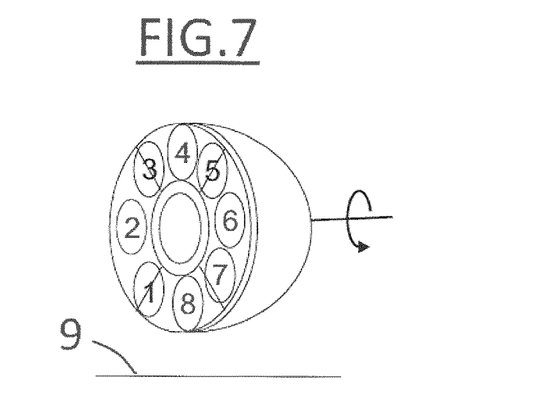
Figure 8:
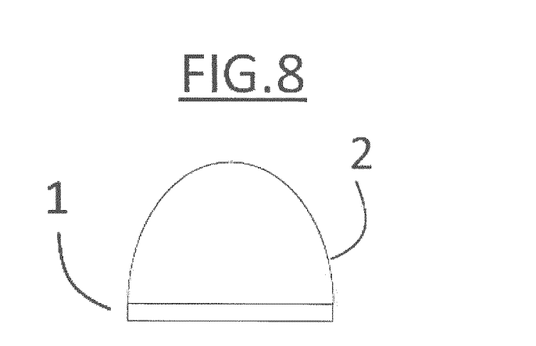

In FIG. 6 the location of capacitive sensors are also displayed and numbered. According to FIG. 6, sensor 1 is located behind the "up button" 8 region of the base. In FIG. 7 the base is rotated and sensor 4 is now located behind the "up button" 8 region of the touchpad. As it is unknown to the user how the device is rotated, the processor on-board the device reads out inputs from the position sensors. With the results it determines the location of the touchpad in respect to the horizon 9. With this information it allocates the appropriate functions to areas of the touchpad.

In FIG. 6 it will assign the "up button" function to capacitive sensor 1 whereas in FIG. 7 it assigns this function to sensor 4. It does this dynamically, Rotating the device results in dynamically allocating functions to areas of the touchpad. The user experiences the same reaction of the device if he presses or touches, for example, on the upper half 8 of the base without knowing the rotation of the device.

Figure 9:
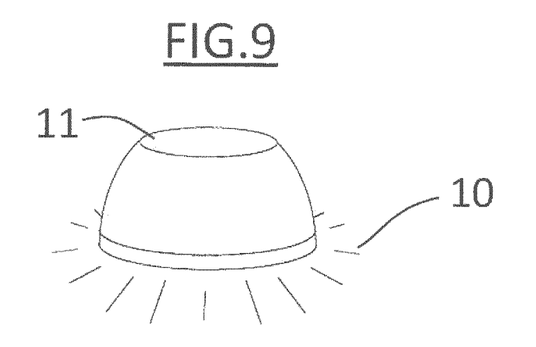

The device may have a visible and audible feedback because it is likely that if the user holds the device by the shell 2 the optical feedback is placed in the base 1 of the device as this is the most unlikely place to be obstructed by the fingers of the user. The electronic control device has no direction. Because of this it is important to show feedback in any direction. It is part of the invention to make the optical feedback visible in a 360 degree radius 10 FIG. 9. To achieve this the whole base 1 is made transparent or semi-transparent and lit up by LEDs. It does not matter how the device is rotated, the user will be able to see its optical feedback. In FIG. 9, the optical feedback is increased by flattening the top of the shell and placing a hole in it. The hole 10 is covered by a semi-transparent lid 11. Feedback in the form of light is transmitted through this window.

The device is equipped with a radio transceiver. The device can receive commands via the radio and convert these to infrared commands. A drawback of infrared communication is the inability of infrared light to pass through solid materials like wooden cabinets. Equipment placed in such cabinets is unable to receive infrared commands. It is one goal of the invention to let the same device act as a radio controlled device also called an extender. Such extender receives commands via radio signals which can travel through solid materials like a wooden cabinet. The received commands are translated back to infrared commands and transmitted inside the cabinet. It is a goal of the invention to configure the device in a way that it acts as an extender device. Exactly the same hardware may be used. In this case the user can operate the device remotely by using another device or a device with a compatible radio transceiver like a mobile phone.

Figure 10:
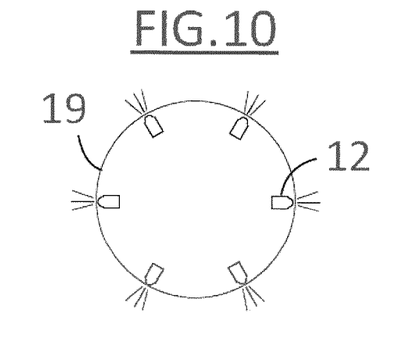

The device emits infrared light via multiple infrared LEDs placed in a circle. In FIG. 10 the circular PCB 19 is shown with infrared LEDs spread out over a 360 degrees. The rotation does not matter as the device emits signals in over a 360 degree pattern. Part of the infrared signals will always arrive at the receiving equipment.

Figure 11:
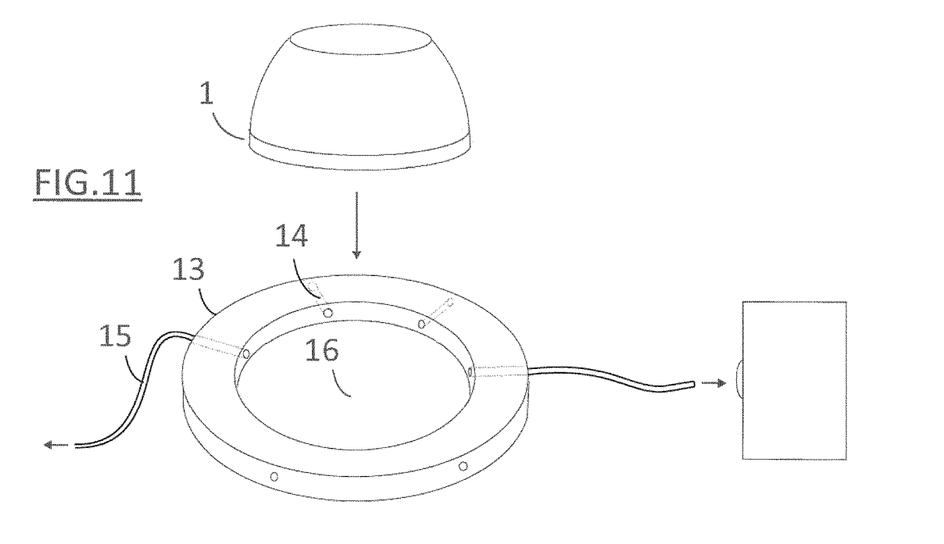
FIGS. 11 and 12: an adaptation of the electronic control device to be used as an extender.

To extend the reach of the device when it is used as an extender, a cradle 13 in FIG. 11 is proposed. The base 1 of the device fits in the hole 16 of the cradle 13. Inside the cradle conduits 14 are placed with fibre optic cables 15 mounted in them. The conduits are placed is such a way that the fibre optic cables optically line up with the infrared diodes 12 in the base 1 (shown in FIG. 10). The ends of the fibre optic cables can be mounted close to the receiving equipment with infrared capabilities. Fibre optic cables are flexible and can be directed towards the receiving equipment, which means the infrared receiving equipment does not need to be in line of sight of the device.

The cradle 13 with its fibre optic cables 15 pre-mounted can be regarded as a passive device. No power source like an adapter or batteries are required to operate the cradle simplifying the installation of the extender.

Figure 12:
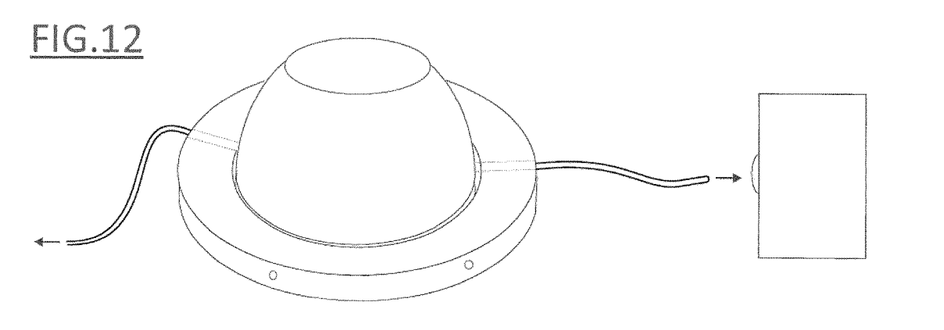

In FIG. 12 the device is mounted into the cradle 1.

The transceiver on-board the device has the ability to determine the proximity to other compatible transceivers.

For example a Bluetooth type transceiver can be used which contains such feature. It is able to read out a unique identifier of every transceiver in its range. This information makes it possible for the device to determine who is operating the device and if there are other users in its proximity. This information can be used by the device to dynamically alter the functionality of the device without user interaction based on who is using the device and who is in proximity to the device. In an example, only favourite channels of user A are selected if user A is operating the device. In another example, if user A and B are not in close proximity of the device certain predefined selectable channels are not selectable forming some sort of parental control function.

It is a goal of the device to operate different equipment without pressing any buttons.

Holding the device in a different position alters the functionality of the device.

Figure 13:
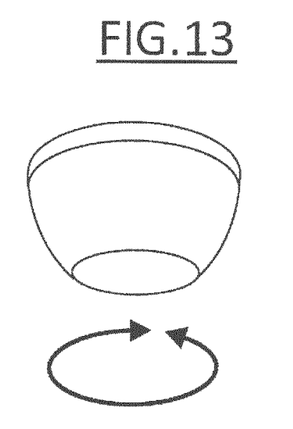
FIGS. 13 to 16: further variations of the electronic control device in accordance with the invention.
Figure 14:
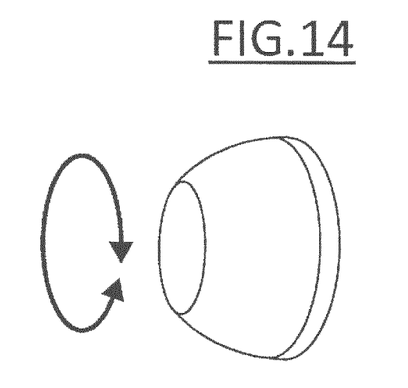

On-board position sensors data is processed which results in the dynamic allocation of functions. Commands sent by the device can control different equipment. As an example, in FIG. 13 the device it held upside down. Rotation of the device could result in dimming the lights. In that case infrared, radio or other commands are sent compatible with the lighting. If the device is held sideways as in FIG. 14, the same rotating action could result in commands being sent compatible with stereo equipment etc.

Figure 15:
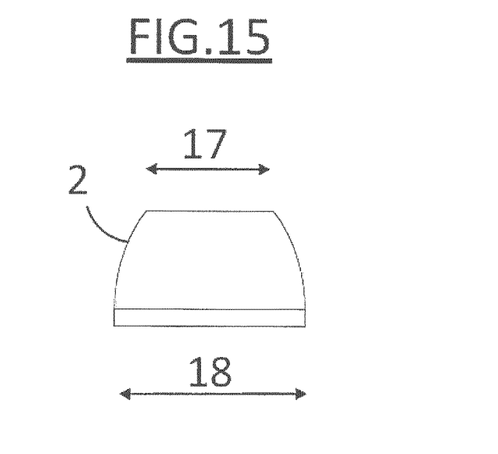

The mechanical construction of the device is done with robustness in mind. In FIG. 15 a metal shell 2 is made in a curved shape. Curved shapes are stronger than a flat shape. The user is able to detect which side is up or down without visual interaction as the curved shape tapers from a big diameter 18 to a smaller diameter 17.

Figure 16:
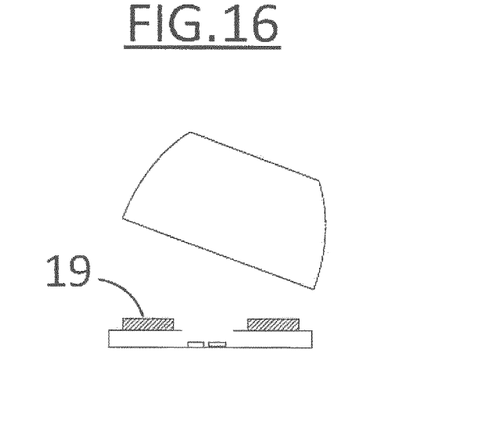

The base 1 of the device is made of a transparent or semi-transparent flexible material like for example silicone. Such material is more shock resilient compared to plastic. The silicone base has a tapered shape which pressfits into the metal shell. Forces needed to remove the shell are low and this can be done by hand. No equipment is needed to remove the shell. The easiness of removing the shell makes it possible to let the user assemble a different shell onto the base. In FIG. 16 the shell is removed from the base and then the batteries become accessible. The user can acquire shells in different colours and shapes and mount these onto the base. In order to do this it must be noted that no other components need to be placed inside the shell. All electronics can be mounted in the base of the device.

Figure 17:
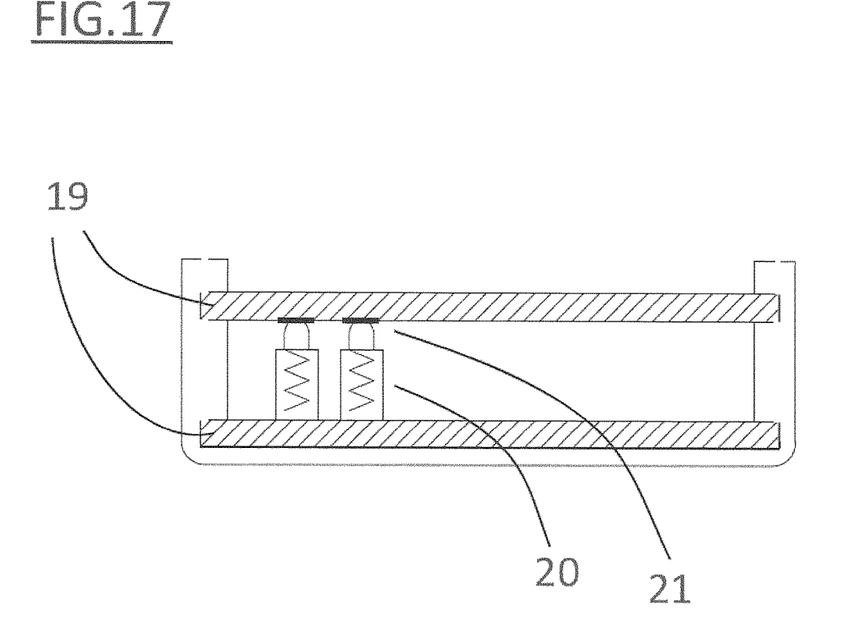
FIG. 17: details of an electronic control device having a base with two printed circuit boards (i.e. two printed circuit boards 19, spring contacts 20 and circular tracks 21)
Figure 18:
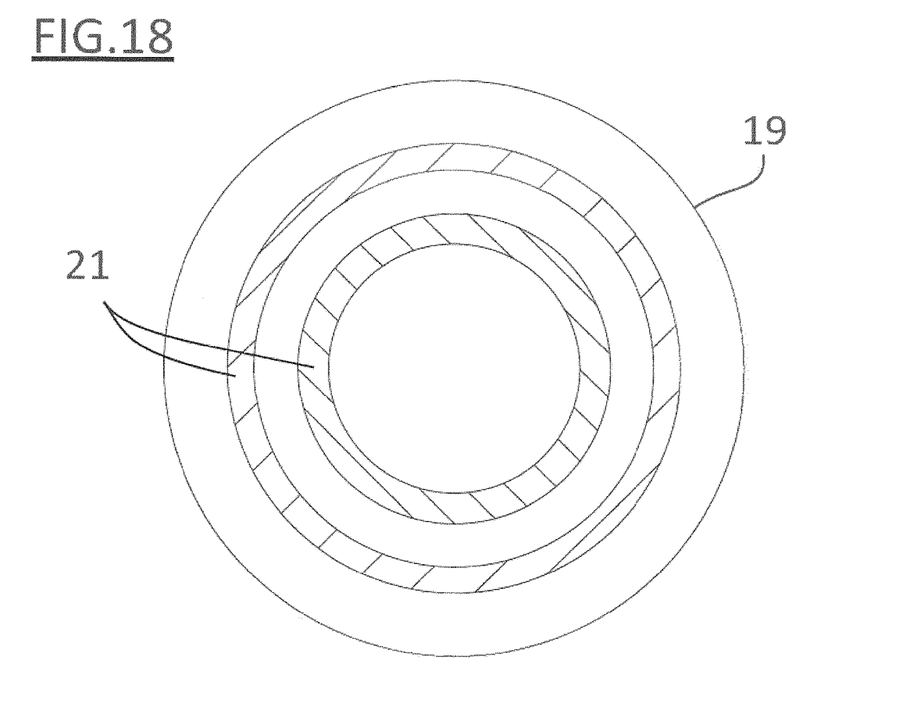
FIG. 18: an electronic control device (i.e. a printed circuit board 19 with circular tracks 21).

FIG. 17 shows that the flexible base holds two printed circuit boards 19. These are pressfit into the silicone base. Spring loaded electrical contacts 20 between the boards connect the boards electrically. When spring contacts are used the landing zone 21 of the contacts touches an exposed circular conductive track placed concentrically located onto the printed circuit board FIG. 18. As a result the angle between both printed circuit boards does not matter as the contacts always hit part of the exposed tracks.

The printed circuit boards have an electrical conductive connector, which is in contact with the metal shell once it is mounted. Via this connection the capacitance of the shell is measured. Removing the shell as in FIG. 16 results in a drop of capacitance, which can be used so as to trigger a change in functionality of the device. For example, if the shell is removed, the device switches to an infrared recording device or into a recording mode. This automatic change in functionality simplifies operation of the device. Putting the shell back onto the base causes a return to normal operation.

The remote control of previous art, utilized optical and mechanical sensors, which executed functions as a result of moving the remote in circular movements. The main objective of the device is to remove the optical and mechanical parts of the conventional remote controls and replace it with a more robust electronic system that can increase the life span as well as the functionality of the ordinary remote control.

The electronic control device according to the invention replaces the optical and mechanical sensors with static (digital) sensors and with this it eliminates all the disadvantages that are associated with the former. These sensors do not rely on the optical characteristics of the surface to operate successfully and the sensors are not subjected to the wear and tear associated with its mechanical counterpart. Compared to the previous art more sensors have been added to the base of the device. This increased the functionality of the product.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. An electronic remote control device, including
a body comprising a circular base;
a touchpad formed by capacitive sensors disposed on the circular base of the body;
a processor disposed within the body; and
position sensors;
wherein the processor is configured to read out inputs from the position sensors and dynamically allocate functions to the capacitive sensors in the touchpad depending on the position of the touchpad in relation to the horizon such that the positioning sensors allow said functions to be executed irrespective of the position of the touchpad in relation to the horizon.

2. The electronic remote control device according to claim 1, wherein the device is arranged such that rotating the device results in dynamically allocating functions to different areas of the touchpad.

3. The electronic remote control device according to claim 1, wherein the device includes capacitive sensors supported by the body adapted to detect interaction of the body with its surroundings; and
wherein the processor is arranged to generate various function control signals dependent upon the interaction of the body with its surroundings.

4. The electronic remote control device according to claim 1, wherein the body of the device is shaped in such way that the user can determine if the device is held upside down.

5. The electronic remote control device according to claim 1, wherein the body of the device tapers from the base upwards towards a smaller diameter at the top.

6. The electronic remote control device according to claim 1, wherein the capacitive sensors of the touchpad are spread out over the bottom.

\* \* \* \* \*